(12) United States Patent
Hornburg et al.

(10) Patent No.: US 8,481,217 B2
(45) Date of Patent: Jul. 9, 2013

(54) METHOD AND APPARATUS FOR SUPPLYING INPUT GASES TO A FUEL CELL STACK

(75) Inventors: Gerald Hornburg, Holzmaden (DE); Matthias Jesse, Dettingen (DE); Cosimo S. Mazzotta, Ulm (DE)

(73) Assignee: Daimler AG, Stuttgart (DE)

( * ) Notice: Subject to any disclaimer, the term of this patent is extended or adjusted under 35 U.S.C. 154(b) by 834 days.

(21) Appl. No.: 12/447,849

(22) PCT Filed: Oct. 31, 2006

(86) PCT No.: PCT/EP2006/010450
§ 371 (c)(1),
(2), (4) Date: Oct. 15, 2009

(87) PCT Pub. No.: WO2008/052577
PCT Pub. Date: May 8, 2008

(65) Prior Publication Data
US 2010/0035100 A1    Feb. 11, 2010

(51) Int. Cl.
*H01M 8/04* (2006.01)
(52) U.S. Cl.
USPC .......................................................... 429/408
(58) Field of Classification Search
None
See application file for complete search history.

(56) References Cited

U.S. PATENT DOCUMENTS

| | | | |
|---|---|---|---|
| 6,849,352 B2 * | 2/2005 | Formanski et al. | ............ 429/415 |
| 2002/0142200 A1 | 10/2002 | Formanski et al. | |
| 2003/0157383 A1 | 8/2003 | Takahashi | |
| 2004/0067400 A1 * | 4/2004 | Steinfort | .......................... 429/26 |
| 2006/0105224 A1 * | 5/2006 | Schwarz et al. | ................. 429/38 |

FOREIGN PATENT DOCUMENTS

| | | |
|---|---|---|
| DE | 100 56 536 A1 | 6/2002 |
| DE | 10 2004 055 158 A1 | 5/2006 |
| EP | 1 339 125 A2 | 8/2003 |
| JP | 2003-24956 A | 9/2003 |
| JP | 2004-319318 A | 11/2004 |
| WO | WO 02/23657 A2 | 3/2002 |
| WO | WO 2006/045020 A2 | 4/2006 |

OTHER PUBLICATIONS

Corresponding International Search Report dated Jul. 11, 2007 (PCT/ISA/210) including Form PCT/ISA/220 with partial English translation (Six (6) pages).

(Continued)

*Primary Examiner* — Patrick Ryan
*Assistant Examiner* — Wyatt McConnell
(74) *Attorney, Agent, or Firm* — Crowell & Moring LLP

(57) ABSTRACT

A fuel supply system for a fuel cell stack includes a cathode gas supply line for supplying an oxidant to the cathode input of the fuel cell stack and an anode gas supply line for supplying fuel to the anode input of the fuel cell stack. An anode gas recirculation line recirculates partially used anode gas from the anode output to the anode input while a purge line may be connected for conducting away the partially used anode gas, as a purge gas from the anode gas recirculation line into the cathode gas supply line. The supply system also includes a conditioning arrangement disposed upstream of the cathode input. The conditioning arrangement is designed to a) mix a partial flow of the oxidant with the purge gas in a mixing station, b) compress accelerate, and/or heat the partial flow or the mixed flow, and c) conduct the mixed flow into the cathode gas supply line.

10 Claims, 3 Drawing Sheets

OTHER PUBLICATIONS

Corresponding Written Office Action of the International Search Agency (Form PCT/ISA/237) with partial English translation (Seven (7) pages).

Notification of Reason for Refusal in related Japanese Patent Application No. 2009-533667 dated Aug. 7, 2012.

* cited by examiner

METHOD AND APPARATUS FOR SUPPLYING INPUT GASES TO A FUEL CELL STACK

This application is a national stage of International Application No. PCT/EP2006/010450, filed Oct. 31, 2006, the entire disclosure of which is herein expressly incorporated by reference.

BACKGROUND AND SUMMARY OF THE INVENTION

The invention relates to a supply method and apparatus for operating a fuel cell stack.

Fuel cell stacks are considered to be a promising energy source, with a plurality of uses. The development of the fuel cells is pursued intensely in the automotive industry as an environmentally friendly energy source for vehicles.

Fuel cell stacks usually comprise a plurality of fuel cells, which generate electric energy from a fuel (often hydrogen) and an oxidant (often ambient air) via an electrochemical process. For this purpose, each of the individual fuel cells has an anode and a cathode region, which are separated from one another by a membrane. Fuel is supplied to the anode region, and oxidant is provided to the cathode region. The electric current is generated by catalytic means with support of transport processes by the interposed membrane.

Even though the basic principle of the fuel cell has, long been known, such intensive developments always lead to new issues with the practical realization of the fuel cell.

International patent document WO 02/23657 A2 focuses for example on the increase of the durability of fuel cell arrangements, by providing a protective housing around the fuel cells. The interior enclosed by the protective housing is switched in a closed circulation circuit to ensure even operating conditions for the fuel cells.

German patent document DE 100 56 536 A1 discloses a fuel cell arrangement wherein, instead of being recirculated, residual anode gases are continually mixed with supply air in a housing enclosing the fuel cell stack, and are then conducted through the cathode section of the fuel cell stack.

German patent document DE 10 2004 055.158 A1, which may show the closest state of the art, discloses a fuel cell system and a method of operating such a fuel cell system, wherein an exhaust gas line of a fuel cell stack on the anode side leads to a suction side of a compressor, into a supply line of the oxidant. During a purge (that is, a temporary purging discharge of the anode gases), the purge gases are mixed with the main oxidant flow, compressed by the compressor, and conducted to the cathode input of the fuel cell stack.

One object of the present invention is to provide a fuel supply system, and a method for its operation, which provide an improved operation of a fuel cell stack.

This and other objects and advantages are achieved by the fuel supply system according to the invention, which is suitable to supply gas to at least one fuel cell stack. The fuel cell stack has a plurality of fuel cells and is preferably formed for operation in a vehicle to provide drive energy for the vehicle. The fuel cell stack may be based on PEM (Proton-Exchange Membrane) technology.

The supply system according to the invention has a cathode gas supply line, which is configured to conduct an oxidant (in particular, ambient air) to a cathode input of the fuel cell stack. An anode gas supply line is configured to conduct fuel (in particular hydrogen) to an anode input of the fuel cell stack. The anode input or the cathode input are connected in a flow-technological manner with the cathode or anode section of the fuel cells.

The partially used anode gas exiting from the anode output is passed back to the anode input, via an anode recirculation line. The use of the anode gas recirculation line takes into consideration the circumstance that the supplied fuel (or hydrogen) is not completely converted electrochemically in the fuel cell stack. The remaining fuel or hydrogen is thus passed back by the anode gas recirculation line, refreshed with fresh (that is, unused) fuel or hydrogen, and passed back to the fuel cell stack via the anode input.

The supply system according to the invention may also include a purge line, which is arranged and/or formed to discharge partially used anode gas from the anode gas recirculation line into the cathode gas recirculation line. (Herein, the discharged partially used anode gas is called "purge gas".) The anode gas is discharged as purge gas as soon as contaminants in the recirculated anode gas have exceeded predetermined limit values and have a disadvantageous effect on the operation of the fuel cell stack.

According to the invention, the supply system comprises a conditioning arrangement upstream of the cathode input. The conditioning arrangement is formed to compress or compact, and/or to accelerate and/or heat a partial flow of the total oxidant supplied to the fuel cell stack, and comprises a mixing station, where the partial flow is combined with the purge gas to form a mixed flow. The partial flow of the oxidant may be heated only when it is mixed with the purge gas. The conditioning arrangement conducts the mixed flow into the cathode gas supply line, thereby implementing three functions, namely the supply of energy to the partial flow or the mixed flow, the mixing of purge gas and partial flow, and the introduction of the mixed flow into the cathode gas supply line.

Applicants have noted that a pre-treatment of the partial flow of the oxidant prior to the mixing with the purge gas, and/or heating of the mixed flow prior to the introduction into the cathode gas supply line permits a very exact control over the condition of the total flow mixture supplied to the fuel cell stack. The added catalytic conversion of the residual hydrogen contained in the purge gas, and thus in the total flow mixture, can be carried out trouble-free due to the improved condition control. In particular in the circumstance that only a partial flow (but not all) of the oxidant may be pretreated as mixed flow, it improves the control over the condition of the resulting total flow mixture.

A preferred embodiment of the supply system according to the invention further comprises a purge valve, via which the purge line can be connected. The purge valve is particularly accessed by a control device, which initiates a purge depending, for example, on i) the energy taken from the fuel cell stack, ii) the time, or iii) measured contaminants in the anode gas. It is again made clear in this embodiment that the purge line is passed through only intermittently, namely during a purge.

In a practical implementation of the supply system according to the invention, the cathode gas supply line comprises a first pump, and the discharge of the conditioning arrangement leads upstream of the first pump into the cathode gas supply line. The first pump thus conveys the mixed flow and the part of the oxidant flow which is not conducted through the conditioning arrangement. The first pump may be of arbitrary construction, in particular as a displacement pump, fluid flow engine, or flow pump.

In a further embodiment of this practical implementation, the supply line for the partial flow of the oxidant branches into the conditioning arrangement in front of the first pump and/or in front of the discharge of the conditioning arrangement. In this embodiment, it is emphasized again that the supply to and discharge from the conditioning arrangement lead into the cathode supply line upstream of the first pump.

In a preferred embodiment of the supply system, the conditioning arrangement comprises a second pump for accelerating, or compressing and/or compacting the particularly unmixed partial flow of the oxidant. The latter pump may be controlled or regulated by a control device, so that the energy conducted to the partial flow by the second pump can be adjusted.

In an advantageous further embodiment, the supply system has a housing which is formed especially for the gas-tight reception of the fuel cell stack(s). The housing has flow-through regions, which are thermally coupled to the fuel cell stack(s). In particular, the thermal coupling comprises a heat exchanger, and the fuel cell stack(s) are used for heating gases flowing through the flow-through regions during operation. At least one part of the flow-through regions, preferably part of the conditioning arrangement or associated therewith, is formed and/or arranged for conducting the mixed flow. The mixed flow is heated by the thermal energy released by the fuel cells during the operation in this arrangement.

In another alternative of the embodiment, the flow-through regions or at least a part thereof are formed for heating the unmixed partial flow. The partial flow is thus compacted and heated before it is mixed with the purge gas at the mixing station.

In a third possible alternative of the embodiment, the mixing station is arranged within the housing (in particular in the flow-through regions), so that the supplied unmixed partial flow, the supplied unmixed purge gas, and the discharged mixed flow are heated.

All three possible alternatives have the advantage that additional energy can be conducted to the gases for the total energy balance in an economical manner.

The invention also relates to a method for operating a supply system such as described above in a vehicle, wherein an anode purge is carried out by connecting the purge line after reaching a critical contamination of the recirculated anode gas, so that the contaminated anode gases are conducted from the anode gas recirculation line into the conditioning arrangement.

Other objects, advantages and novel features of the present invention will become apparent from the following detailed description of the invention when considered in conjunction with the accompanying drawings.

DETAILED DESCRIPTION OF THE DRAWINGS

Figure 1:
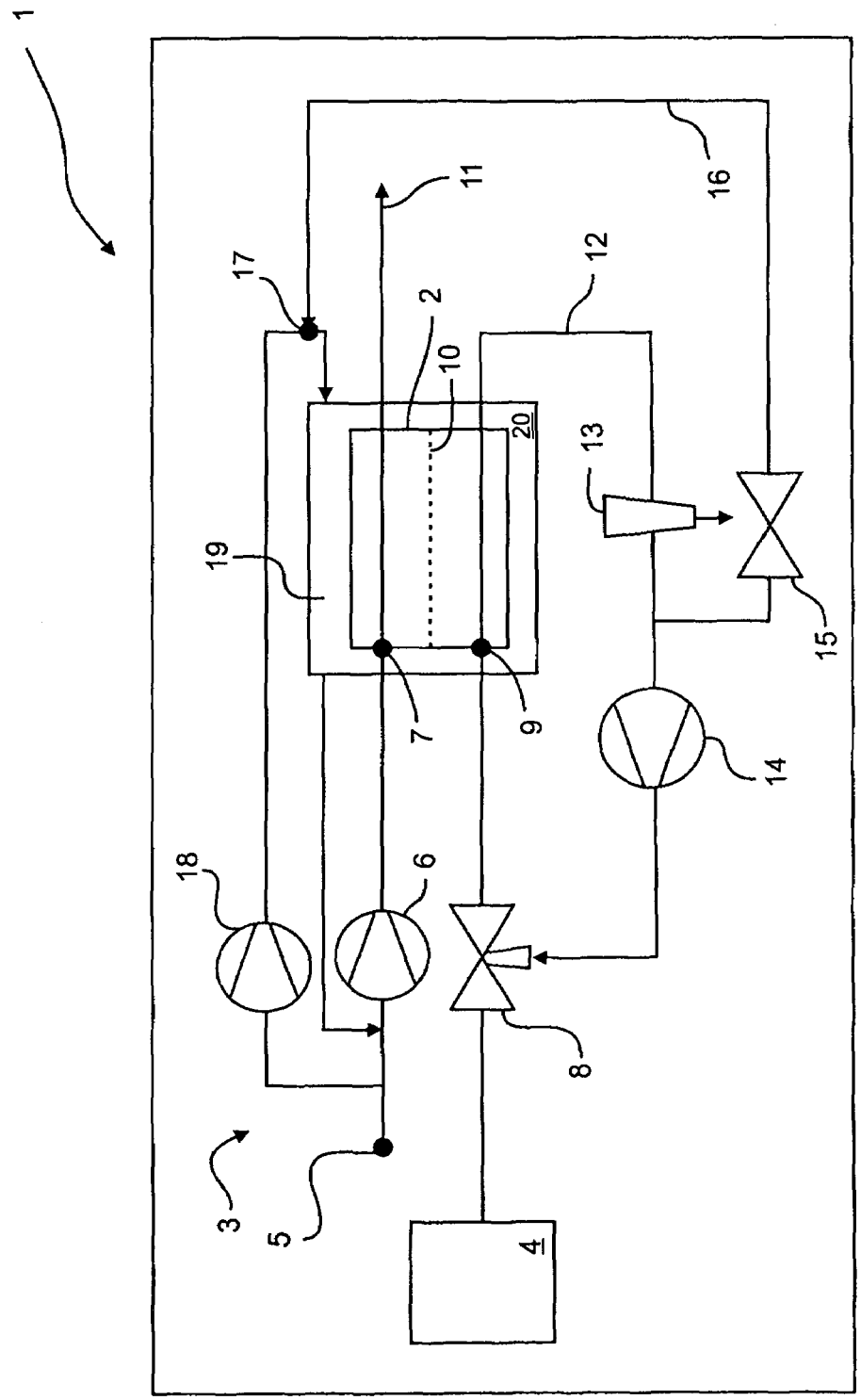
FIG. 1 is a schematic block diagram of a fuel cell system with a first embodiment of the invention in the form of a gas supply system.

The same or corresponding parts are provided with the same reference numerals in the figures.

FIG. 1 shows a fuel cell system 1 which includes a fuel cell stack 2, and a gas supply system 3 which supplies the fuel cell stack with the operating gases which are necessary for operation. The fuel cell system 1 may be used, for example, in a vehicle (not shown) to generate drive energy for an engine. The fuel cell stack 2 has a plurality of fuel cells which are formed in the PEM technology.

A fuel in the form of hydrogen from a refillable holding tank 4 and an oxidant in the form of ambient air from a supply line 5 are conducted to the fuel cell system 1 for feeding the fuel cell stack 2. The ambient air is compressed, starting from the supply line 5, by a first pump 6, and conducted to the fuel cell stack 2 via a cathode input 7. Starting from the holding tank 4, the hydrogen is brought to an anode input 9 into the fuel cell stack 2 via a valve 8. Oxidant and fuel are electrochemically reacted with one another in the fuel cell stack 2, the oxidant being conducted through a cathode region, and the fuel through an anode region. The latter two regions are separated from one another by a PEM membrane 10. The residual cathode gases resulting during the electrochemical reaction are discharged to the environment via an outlet 11.

The partially used anode gases are however passed back to the valve 8 via an anode recirculation line 12, reconditioned with fresh hydrogen from the holding tank 4 and conducted back to the anode input 9. A water precipitator 13 is optionally provided in the anode recirculation line 12, and a recirculation pump 14 for compressing the recirculated anode gas.

The entire anode gas exiting from the anode output is passed back during the recirculation, so as to use hydrogen still present in the exiting anode gas for the electrochemical reaction of the fuel cell stack 2 and to optimize the energy balance of the fuel cell system 1 in this manner.

However, contaminants accumulate in the anode gas due to the recirculation, so that it is necessary to eject the contaminated anode gas or at least parts thereof, periodically. For this purpose, gas supply system 1 has a purge line 16 which can be connected to the recirculation line 12 via a second valve 15. The purge line 16 branches off from the anode gas recirculation line 12 at an arbitrary location, here between the water precipitator 13 and the recirculation pump 14.

The purge line 16 ends in a mixing station 17, where a partial flow of the oxidant is admixed to the purge gas. The partial oxidant flow is conducted, starting from the supply line 5, over a second pump 18, and compressed and/or accelerated therein. The mixed flow, consisting of partial oxidant flow and purge gas downstream of the mixing station 17, is subsequently conducted into a flow-through region 19 of a housing 20 surrounding the fuel cell stack 2. The flow-through region 19 is thermally coupled to the fuel cell stack 2, so that the mixed flow conducted through the flow region 19 is heated. The mixed flow exits from the flow-through region 19 in its further course, and thus from the housing 20, and is passed back to the residual oxidant stream upstream of the first pump 6.

After a compression by the pump 6, the resulting total flow mixture is conducted through the cathode region of the fuel cell stack 2, wherein the residual hydrogen is catalytically converted to water. The residual cathode gas is blown into the environment in an environmentally compatible manner.

The condition of the total gas flow mixture conducted to the cathode region of the fuel cell stack 2 can be controlled very well by division of the oxidant flow and possible regulation via the second pump 18, so that critical operating conditions can be avoided effectively.

Figure 2:
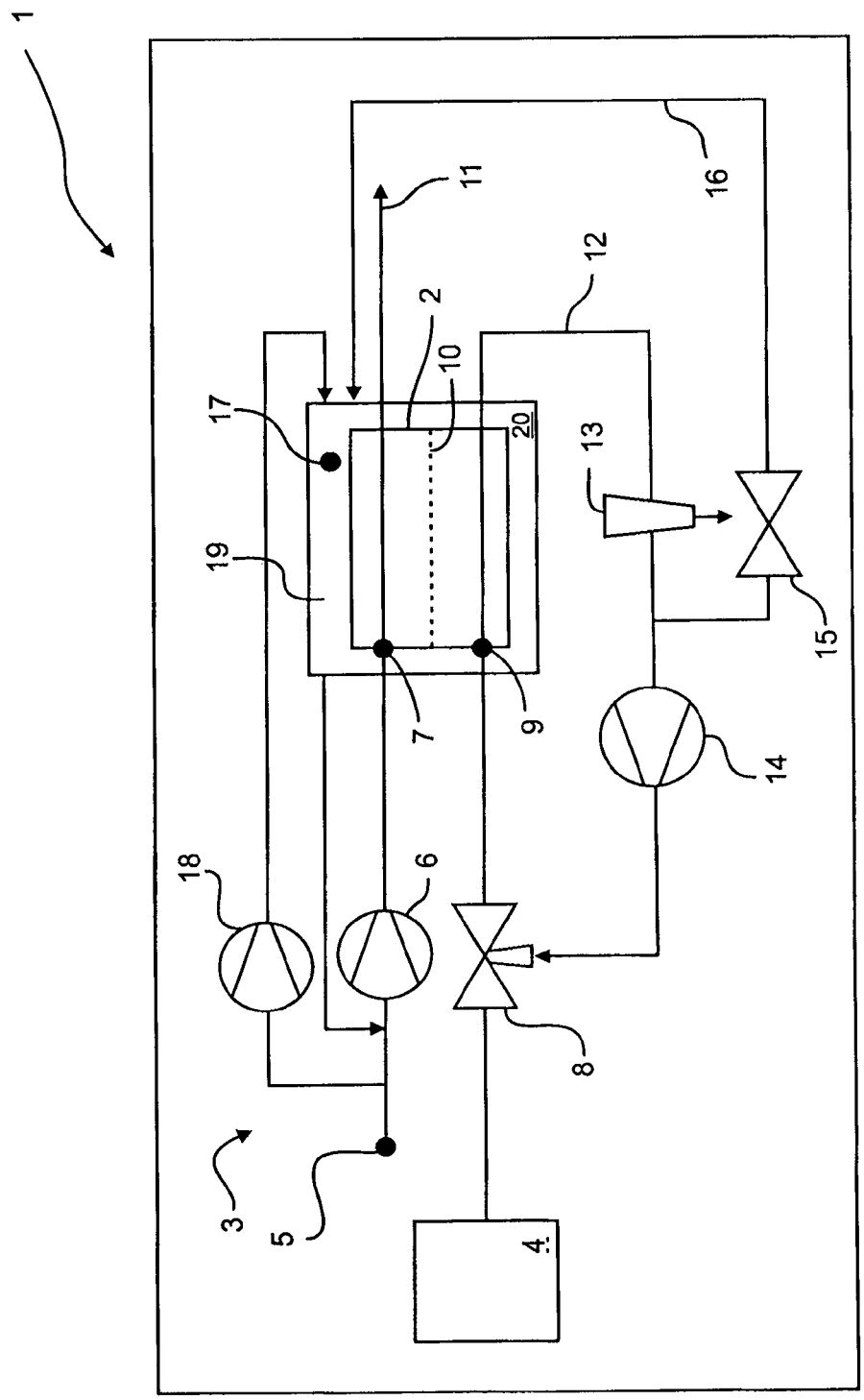
FIG. 2 is a schematic block diagram of a modification of the fuel cell system in FIG. 1 with a second embodiment of the invention in the form of a gas supply system.

FIG. 2 shows a modification of the fuel cell system 1 in FIG. 1, wherein the compressed partial flow of the oxidant and the purge gas are conducted separatedly into the housing 20, so that the mixture of the gas flows takes place in the flow-through region 19 within the housing 20.

Figure 3:
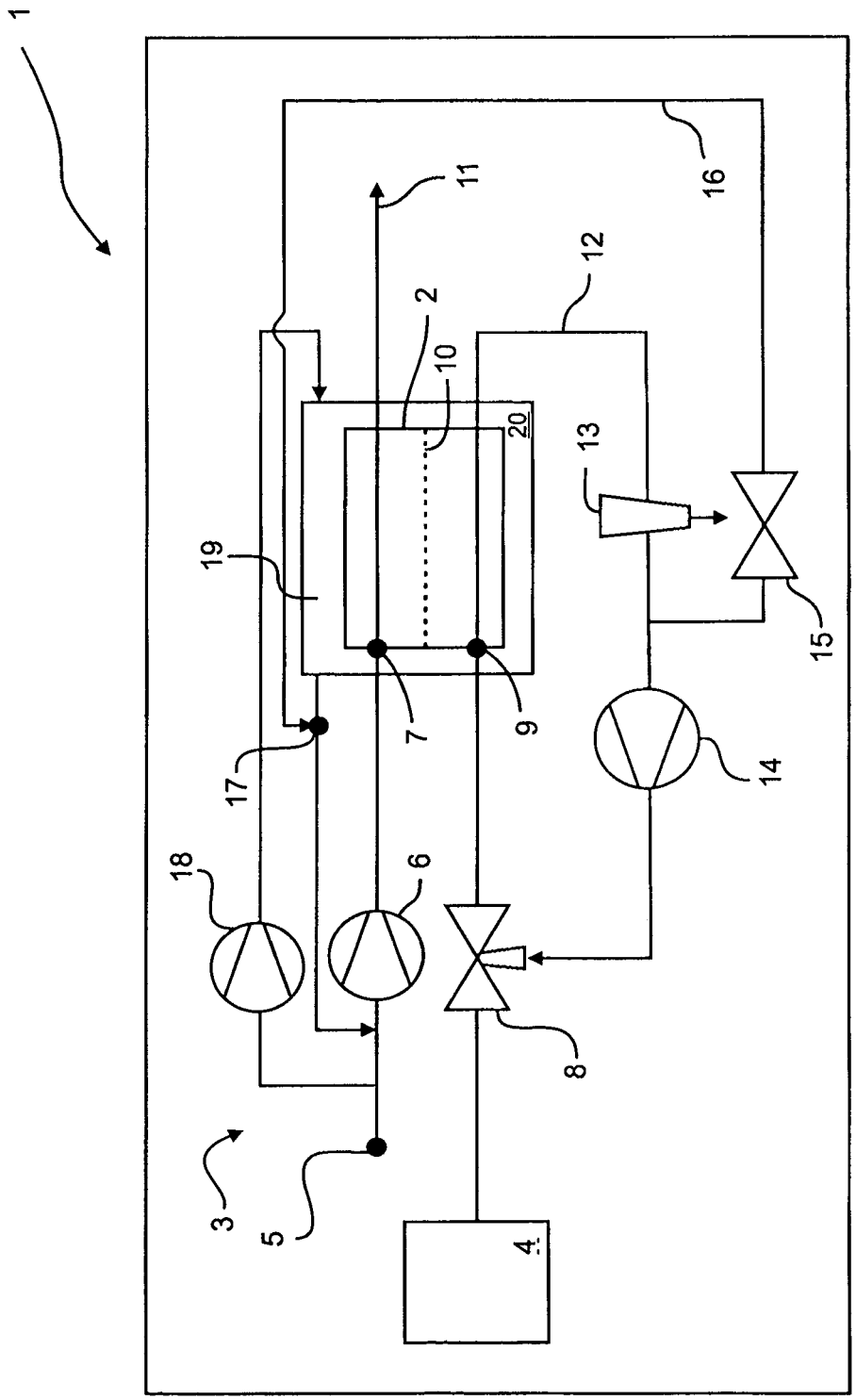
FIG. 3 is a schematic block diagram of a further modification of the fuel cell system in FIG. 1 with a third embodiment of the invention in the form of a gas supply system.

FIG. 3 shows a second modification of the fuel cell system 1 in FIG. 1, wherein the mixing station 17 is arranged downstream of the housing 20, so that only the compressed partial flow of the oxidant, but not the purge gas, is conducted through the flow-through region 19.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A supply system for a fuel cell stack, said supply system comprising:
   a cathode gas supply line for supplying an oxidant to a cathode input of the fuel cell stack;
   an anode gas supply line for supplying a fuel to an anode input of the fuel cell stack;
   an anode gas recirculation line for recirculating partially reacted anode gas from an anode output to the anode input; and
   a purge line connected to convey the partially used anode gas as purge gas from the anode gas recirculation line into the cathode gas supply line;
   a partial flow line connected to and branching off from the cathode gas supply line in such a manner that the partial flow line receives a partial flow of the oxidant from the cathode gas supply line; and
   a conditioning arrangement arranged upstream of the cathode input and connected to the partial flow line, wherein the conditioning arrangement includes a mixing station to mix the partial flow of the oxidant supplied by the partial flow line with the purge gas and a device to compress, accelerate or heat the gas flow from the mixing station, and conduct it into the cathode gas supply line.

2. The supply system according to claim 1, wherein the purge line can be connected to the recirculation line via a purge valve.

3. The supply system according to claim 1, wherein:
   the cathode gas supply line has a first pump; and
   the discharge of the conditioning arrangement leads into the cathode gas supply line, upstream of the first pump.

4. The supply system according to claim 3, wherein the partial flow line branches off of the cathode supply line upstream of the first pump and/or prior to a discharge of the conditioning arrangement.

5. The supply system according to claim 1, wherein the conditioning arrangement comprises a second pump for the acceleration or compression of the partial flow of the oxidant.

6. The supply system according to claim 1, further comprising a housing for receiving the fuel cell stack; wherein the housing comprises flow-through regions, which are thermally coupled to the fuel cell stack.

7. The supply system according to claim 6, wherein:
   the conditioning arrangement comprises the flow through regions at least partially; and
   the flow-through regions are configured to conduct the mixed flow.

8. The supply system according to claim 6, wherein:
   the conditioning arrangement comprises the flow-through regions at least partially; and
   the flow-through regions are configured to conduct an unmixed partial flow of the oxidant.

9. The supply system according to claim 6, wherein:
   the conditioning arrangement comprises the flow-through regions at least partially; and
   the mixing station is arranged in the flow-through regions for mixing the partial flow with the purge gas.

10. A method for operating a supply system for a fuel cell stack, the method comprising:
    supplying, by a cathode gas supply line, an oxidant to a cathode input of the fuel cell stack;
    supplying, by an anode gas supply line, a fuel to an anode input of the fuel cell stack;
    recirculating, by an anode gas recirculation line, partially reacted anode gas from an anode output to the anode input;
    conveying, by a purge line, the partially used anode gas as purge gas from the anode gas recirculation line into the cathode gas supply line;
    receiving, by a partial flow line connected to and branching off from the cathode supply line, a partial flow of the oxidant from the cathode gas supply line;
    mixing, by a mixing station of a conditioning arrangement that is arranged upstream of the cathode input and connected to the partial flow line, the partial flow of the oxidant supplied by the partial flow line with the purge gas;
    compressing, accelerating or heating the gas flow from the mixing station, and conducting it into the cathode gas supply line; and
    connecting the purge line when a critical contamination of the recirculated anode gas is reached, so that the contaminated anode gases are conducted as purge gases from the anode gas recirculation line into the conditioning arrangement.

* * * * *